United States Patent
Wang et al.

(10) Patent No.: US 11,929,464 B2
(45) Date of Patent: Mar. 12, 2024

(54) CONVEYING ROLLER, WINDER AND METHOD FOR CONVEYING CELL POLE PIECE

(71) Applicant: Contemporary Amperex Technology Co., Limited, Ningde (CN)

(72) Inventors: Yiruo Wang, Ningde (CN); Xiaowei Zhang, Ningde (CN); Hongwen Chang, Ningde (CN); Xiao Wang, Ningde (CN); Peichao Wang, Ningde (CN); Xi Chen, Ningde (CN)

(73) Assignee: Contemporary Amperex Technology Co., Limited, Ningde (CN)

( * ) Notice: Subject to any disclaimer, the term of this patent is extended or adjusted under 35 U.S.C. 154(b) by 902 days.

(21) Appl. No.: 16/964,324

(22) PCT Filed: Oct. 12, 2019

(86) PCT No.: PCT/CN2019/110769
§ 371 (c)(1),
(2) Date: Jul. 23, 2020

(87) PCT Pub. No.: WO2020/088220
PCT Pub. Date: May 7, 2020

(65) Prior Publication Data
US 2021/0043980 A1   Feb. 11, 2021

(30) Foreign Application Priority Data

Oct. 31, 2018   (CN) .......................... 201811290089.4

(51) Int. Cl.
*H01M 10/0587*   (2010.01)
*B65H 23/26*   (2006.01)
*H01M 4/04*   (2006.01)

(52) U.S. Cl.
CPC ........ *H01M 10/0587* (2013.01); *B65H 23/26* (2013.01); *H01M 4/04* (2013.01); *B65H 2601/2531* (2013.01); *B65H 2601/525* (2013.01)

(58) Field of Classification Search
CPC ...... H01M 10/0587; H01M 4/04; B65H 23/26
See application file for complete search history.

(56) References Cited

FOREIGN PATENT DOCUMENTS

| CN | 203398093 U | 1/2014 |
| CN | 203754087 U | 8/2014 |

(Continued)

OTHER PUBLICATIONS

Machine translation of CN 207967154 U. (Year: 2018).*

(Continued)

*Primary Examiner* — Jonathan G Jelsma
(74) *Attorney, Agent, or Firm* — East IP P.C.

(57) ABSTRACT

The present disclosure relates to a conveying roller for conveying a cell pole piece, the cell pole piece comprising a main body and pole tabs, the main body comprising a bearing area and a transition area, each of the pole tabs comprising a root portion connected to the transition area, a middle section and a top portion, and the conveying roller comprising: a central axis, a first end face and a second end face disposed opposite to each other along the central axis, a transmission portion and an avoidance position provided between the first end face and the second end face, wherein the transmission portion is rotatable around the central axis, the bearing area is contactable with the transmission portion, so that the transmission portion applies a transmission friction force to the cell pole piece, and the avoidance position is capable of avoiding the transition area and the pole tabs.

20 Claims, 4 Drawing Sheets

(56) References Cited

FOREIGN PATENT DOCUMENTS

| | | | | | |
|---|---|---|---|---|---|
| CN | 105855325 | A | | 8/2016 | |
| CN | 206907862 | U | | 1/2018 | |
| CN | 206976508 | U | | 2/2018 | |
| CN | 207967154 | U | | 10/2018 | |
| CN | 108987820 | A | * | 12/2018 | ........ H01M 10/0587 |
| CN | 208189698 | U | | 12/2018 | |
| CN | 209056564 | U | | 7/2019 | |
| JP | 2016134239 | A | | 7/2016 | |
| KR | 20150025381 | A | | 3/2015 | |

OTHER PUBLICATIONS

The extended European search report for European Application No. 19858689.3, dated Oct. 26, 2020, 7 pages.
PCT International Search Report for PCT/CN2019/110769, dated Jan. 21, 2020, 14 pages.
The First Office Action for EP Application No. 19858689.3, dated Mar. 7, 2022, 4 pages.

* cited by examiner

CONVEYING ROLLER, WINDER AND METHOD FOR CONVEYING CELL POLE PIECE

CROSS REFERENCE

The present disclosure is a National Stage of International Application No. PCT/CN2019/110769, filed on Oct. 12, 2019, which claims priority from Chinese patent application 201811290089.4, entitled "Conveying Roller and Winder", filed on Oct. 31, 2018, both of which are incorporated herein by reference in their entireties.

TECHNICAL FIELD

The present disclosure relates to the technical field of a battery, and in particular, to a conveying roller, a winder, and a method for conveying cell pole piece.

BACKGROUND

With a rapid development of a lithium battery industry, a requirement on a production efficiency of a cell is becoming higher and higher. The cell is formed by a winding of a cell pole piece. The cell pole piece includes a main body and pole tabs. A winding process is a key process for the cell, a winding efficiency of a winder greatly affects the production efficiency of the cell. Therefore, in order to improve the production efficiency of the cell, a winding speed of the winder is generally increased in a prior method. However, as the winding speed increases, problems such as a bending of pole tabs and the like arise and a quality of the cell cannot be guaranteed.

SUMMARY

Embodiments of the present disclosure provide a conveying roller, a winder, and a method for conveying cell pole piece. The conveying roller is able to reduce a possibility of a turning outward or bending of pole tabs, and a quality of a finished cell can be guaranteed.

In an aspect, an embodiment of the present disclosure provides a conveying roller for conveying a cell pole piece, the cell pole piece comprising a main body and pole tabs, the main body comprising a bearing area and a transition area, each of the pole tabs comprising a root portion connected to the transition area, a middle section and a top portion, and the conveying roller comprising: a central axis, a first end face and a second end face disposed opposite to each other along the central axis, a transmission portion and an avoidance position provided between the first end face and the second end face, wherein the transmission portion is rotatable around the central axis, the bearing area is contactable with the transmission portion, so that the transmission portion applies a transmission friction force to the cell pole piece, and the avoidance position is capable of avoiding the transition area and the pole tabs.

According to an aspect of the embodiment of the present disclosure, the conveying roller comprises a mandrel, an axis of the mandrel coincides with the central axis, the transmission portion is configured as a first rotating cylinder sleeved on the mandrel, the bearing area is capable of abutting against an outer peripheral surface of the first rotating cylinder, two end faces of the mandrel opposite to each other along the central axis respectively form the first end face and the second end face, and a space between an end face of the first rotating cylinder facing the second end face and the second end face forms the avoidance position.

According to an aspect of the embodiment of the present disclosure, a difference between a radius of the first rotating cylinder and a radius of the mandrel ranges from 0.1 mm to 0.5 mm.

According to an aspect of the embodiment of the present disclosure, an annular edge of the first rotating cylinder adjacent to the second end face comprises a rounded transition structure.

According to an aspect of the embodiment of the present disclosure, the conveying roller comprises a mandrel and a second rotating cylinder sleeved on the mandrel, two end faces of the mandrel opposite to each other along the central axis respectively form the first end face and the second end face, the second rotating cylinder comprises a first shaft section and a second shaft section, a diameter of the first shaft section is larger than that of the second shaft section, the transmission portion is configured as the first shaft section, the bearing area is capable of abutting against an outer peripheral surface of the first shaft section, and a space between an outer peripheral surface of the first shaft section and an outer peripheral surface of the second shaft section forms the avoidance position.

According to an aspect of the embodiment of the present disclosure, a difference between a radius of the first shaft section and a radius of the second shaft section ranges from 0.1 mm to 0.5 mm.

According to an aspect of the embodiment of the present disclosure, a distance between an end face of the first shaft section facing the second end face and an end face of the second shaft section facing the second end face ranges from 5 mm to 30 mm.

According to an aspect of the embodiment of the present disclosure, an annular edge of the first shaft section adjacent to the second end face comprises a rounded transition structure.

According to an aspect of the embodiment of the present disclosure, the conveying roller further comprises a smoothing part provided corresponding to the avoidance position in position, the pole tabs are capable of passing between the smoothing part and the avoidance position, and the smoothing part is capable of applying a force to the pole tabs toward the central axis to smooth the pole tabs.

According to an aspect of the embodiment of the present disclosure, the smoothing part comprises a first smoothing plate and a second smoothing plate, and the first smoothing plate and the second smoothing plate are arranged around the central axis.

The conveying roller in this embodiment includes the central axis, the first end face and the second end face disposed opposite to each other along the central axis, and the transmission portion and the avoidance position disposed between the first end face and the second end face. The transmission portion and the avoidance position are arranged along the central axis. When the conveying roller conveys the cell pole piece, the bearing area of the cell pole piece can be in contact with the transmission portion, so that the transmission portion applies a transmission friction force to the cell pole piece and thereby the cell pole piece is moved by the transmission portion. At the same time, the avoidance position of the conveying roller can avoid the transition area and the entire pole tabs of the cell pole piece. In this way, in the process of the conveying roller in this embodiment conveying the cell pole piece, as the conveying roller includes the avoidance position, uneven edges of the main body between two pole tabs will not contact with the conveying roller. The conveying roller does not apply compressive stress to a raised area in the uneven edges of the main body and the pole tabs, so that the pole tabs do not move in a direction away from the conveying roller by a distance which is the same as the protruding height of the raised area. Therefore, when the conveying roller drives the cell pole piece to rotate at high speed, the centrifugal force experienced by the pole tabs will not increase, which effectively reduces the possibility of the pole tabs turning outward and bending away from the conveying roller under the effect of the centrifugal force, reduces the possibility of the insulating film punctured by the pole tabs turned outward and bent, and improves the yield of a cell formed by winding and safety of subsequent use.

In another aspect, an embodiment of the present disclosure provides a winder comprising the conveying roller in the above embodiment.

In still another aspect, an embodiment of the present disclosure provides a method for conveying a cell pole piece, wherein the conveying roller in the above embodiment is used to convey the cell pole piece, and the transmission portion applies a transmission friction force to the bearing area of the cell pole piece to drive the cell pole piece to move in a transmission direction, and the avoidance position of the conveying roller avoids the transition area and the pole tabs of the cell pole piece.

BRIEF DESCRIPTION OF THE DRAWINGS

Features, advantages, and technical effects of exemplary embodiments of the present disclosure will be described below with reference to the drawings.

In the drawings, the drawings are not drawn to actual scale.

DESCRIPTION OF REFERENCE NUMBERS

10, Cell pole piece; 11, Main body; 11*a*, Bearing area; 11*b*, Transition area; 12, Pole tab; 12*a*, Root portion; 12*b*, Middle section; 12*c*, Top portion;
20, Conveying roller; 20*a*, Center axis; 21, First end face; 22, Second end face; 23, Mandrel; 24, First rotating cylinder; 24*a*, Rounded transition structure; 25, Avoidance position; 26, Second rotating cylinder; 26*a*, First shaft section; 26*b*, Second shaft section; 27, Smoothing part; 27*a*, First smoothing plate; 27*b*, Second smoothing plate;

X, Width direction; Y, Length direction.

DETAILED DESCRIPTION

Embodiments of the present disclosure are described further in detail below with reference to drawings and embodiments. The detailed description and drawings of the following embodiments are used to exemplarily illustrate the principle of the present disclosure, and cannot be used to limit the scope of the present disclosure, that is, the present disclosure is not limited to the described embodiments.

In the description of the present disclosure, it should be noted that, unless otherwise stated, the meaning of "a plurality" is two or more; the terms "upper", "lower", "left", "right", "inner" and "outer", etc. indicating the directions or positional relationships are only for the convenience of describing the present disclosure and simplifying the description, do not indicate or imply that the device or element referred to must have a specific orientation, structure and operation in a specific orientation, and cannot be understood as a limitation on the present disclosure. In addition, the terms "first", "second", etc. are used for descriptive purposes only, and should not be interpreted as indicating or implying relative importance.

In the description of the present disclosure, it should also be noted that the terms "installation", "connection", and "attachment" should be understood in a broad sense unless otherwise specified and limited. For example, it may be a fixed connection or a detachable connection, or an integral connection; it can be a direct connection or indirect connection through an intermediate medium. For those of ordinary skill in the art, specific meanings of the above terms in the present disclosure may be understood according to specific situations.

In order to better understand the present disclosure, a conveying roller 20 will be described in detail below with reference to FIG. 1 to FIG. 8 according to an embodiment of the present disclosure.

Figure 1:
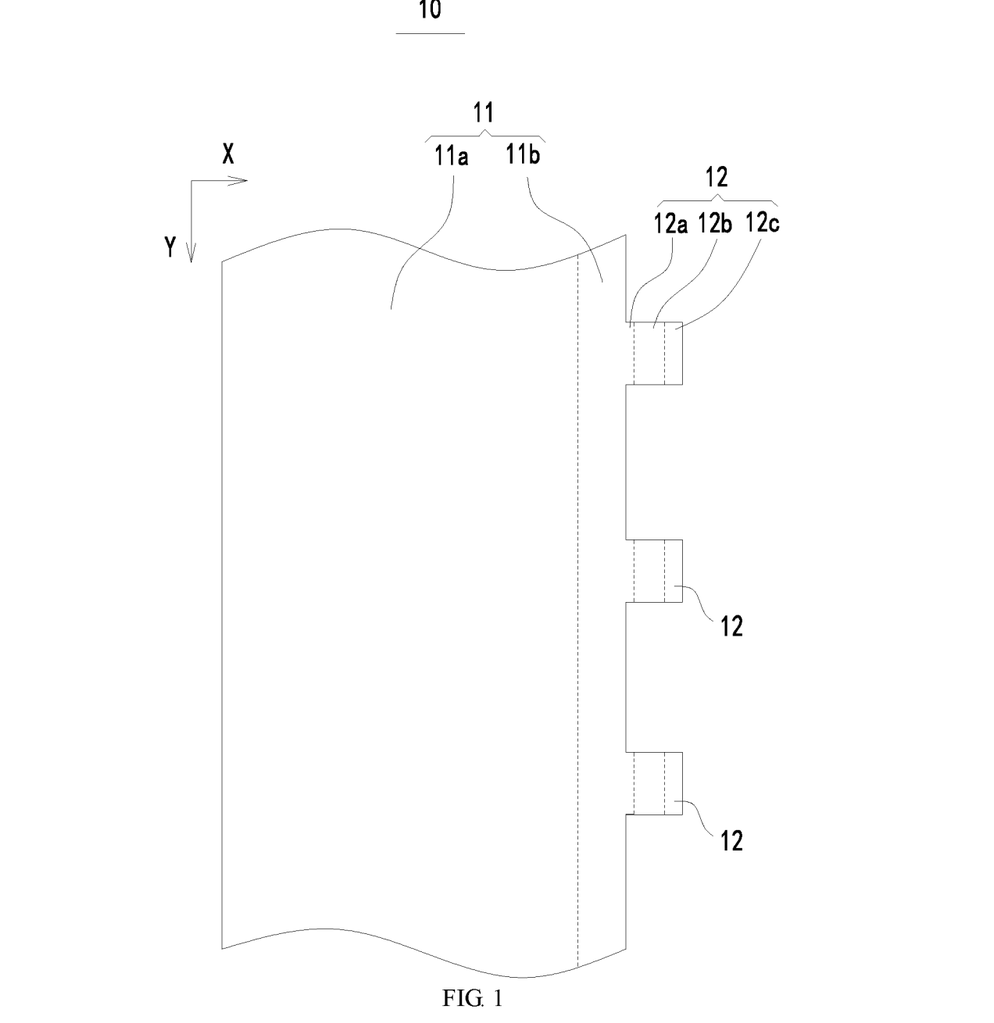
FIG. 1 is a structure schematic view of a cell pole piece according to an embodiment of the present disclosure.
Figure 2:
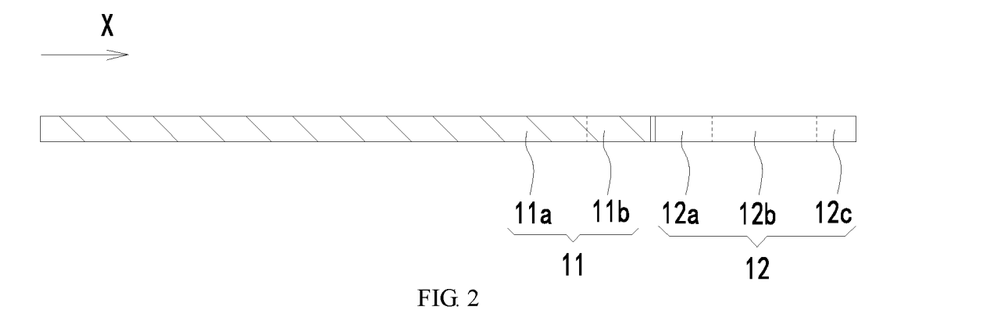
FIG. 2 is a cross-sectional structure schematic view of a cell pole piece according to an embodiment of the present disclosure.
Figure 3:
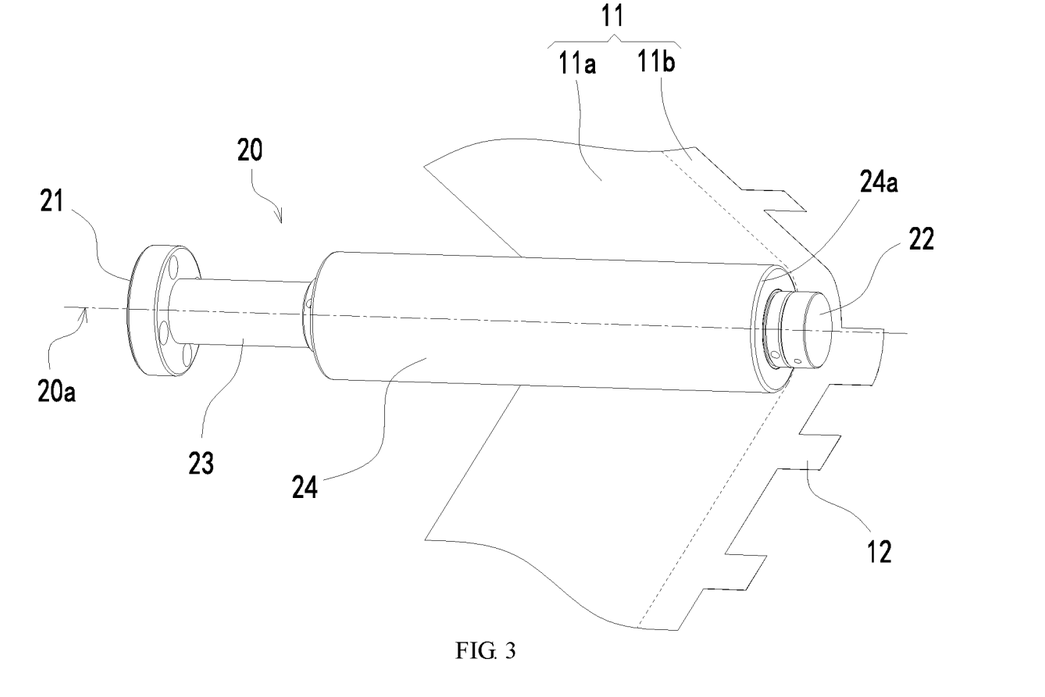
FIG. 3 is a isometric schematic view of a fitting state of a conveying roller and a cell pole piece according to an embodiment of the present disclosure.

Referring to FIG. 1 and FIG. 2, the cell pole piece 10 according to the embodiment of the present disclosure has a predetermined length and width. The cell pole piece 10 includes a main body 11 and pole tabs 12 connected to the main body 11. Both the main body 11 and the pole tabs 12 of the cell pole piece 10 have a thin sheet structure and are soft and easily deformed. The main body 11 and the pole tabs 12 are arranged in a width direction X. The number of the pole ears 12 is two or more. In this embodiment, two or more pole tabs 12 are provided on the main body 11 at intervals along a length direction Y of the cell pole piece 10. The main body 11 includes a bearing area 11*a* and a transition area 11*b* arranged in a width direction X. Dotted lines shown in FIG. 1 to indicate a boundary between the bearing area 11*a* and the transition area 11*b* do not represent a physical structure. Each of the pole tabs 12 includes a root portion 12*a*, a middle section 12*b*, and a top portion 12*c* arranged in the width direction X. The root portion 12*a* of each of the pole tabs 12 is connected to the transition area 11*b*. The main body 11 in this embodiment includes an edge (that is, an edge of the transition area 11 *b*) located between two pole tabs 12. Each pole tab 12 of the cell pole piece 10 is formed by cutting excess material from the entire pole piece blank through a cutting process. After the cutting process, the pole tabs 12 and the main body 11 are formed on the pole piece blank. However, edges of tabs 12 and edges of the main body 11 between two tabs 12 may be uneven. As shown in FIG. 3, in a process of winding the cell pole piece 10 to form the cell in the embodiment, the cell pole piece 10 needs to be conveyed to a winding needle via a conveying roller 20, so that a cell meeting a product requirement is wound via the winding needle. A rotating speed of the conveying roller 20 is high to improve a conveying efficiency for the cell pole piece 10. When the cell pole piece 10 passes the conveying roller 20, the pole tabs 12 may possibly turn outward or bend away from the conveying roller 20 under an action of centrifugal force.

Figure 4:
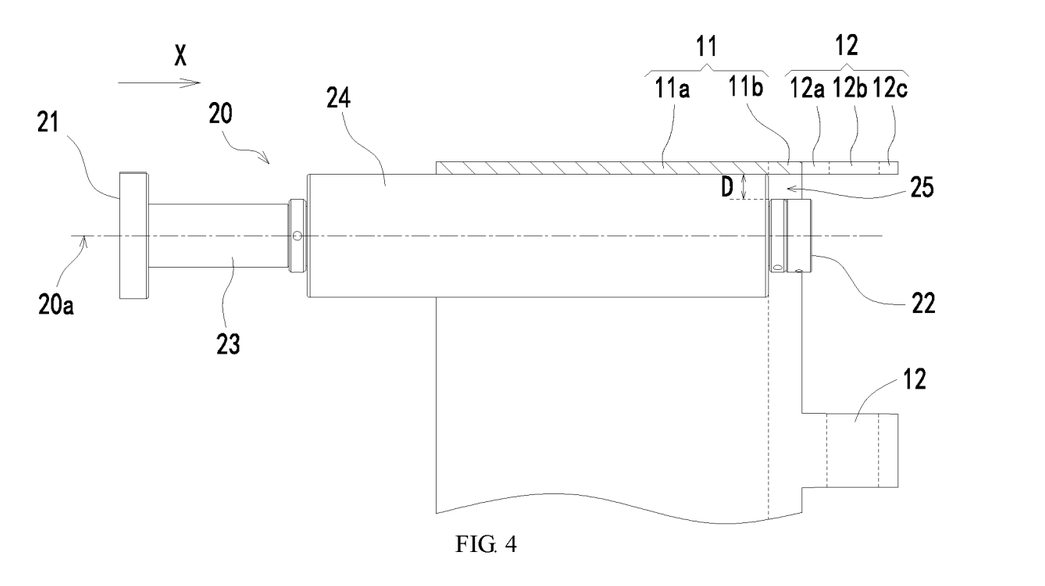
FIG. 4 is a partial structure schematic view of a mating state of a conveying roller and a cell pole piece according to an embodiment of the present disclosure.

Continuing to refer to FIG. 4, the conveying roller 20 in this embodiment includes a central axis 20a, a first end face 21 and a second end face 22 disposed opposite to each other along the central axis 20a, and a transmission portion and an avoidance position 25 disposed between the first end face 21 and the second end face 22. The transmission portion and the avoidance position 25 are arranged along the central axis 20a, i.e., along the width direction X. The transmission portion can rotate around the center axis 20a. When the conveying roller 20 conveys the cell pole piece 10, the bearing area 11a of the cell pole piece 10 can be in contact with the transmission portion, so that the transmission portion applies a transmission friction force to the cell pole piece 10 and thereby the cell pole piece 10 is moved by the transmission portion. At the same time, the avoidance position 25 of the conveying roller 20 can avoid the transition area 11b and the entire pole tabs 12 of the cell pole piece 10. In this way, in the process of the conveying roller 20 in this embodiment conveying the cell pole piece 10, as the conveying roller 20 includes the avoidance position 25, uneven edges of the main body 11 between two pole tabs 12 will not contact with the conveying roller 20. The conveying roller 20 does not apply compressive stress to a raised area in the uneven edges of the main body 11 and the pole tabs 12, so that the pole tabs 12 do not move in a direction away from the conveying roller 20 due to a pressing action of the conveying roller 20 by a distance which is the same as a protruding height of the raised area. Therefore, when the conveying roller 20 drives the cell pole piece 10 to rotate at high speed, the centrifugal force experienced by the pole tabs 12 will not increase, which effectively reduces the possibility of the pole tabs 12 turning outward and bending away from the conveying roller 20 under the effect of the centrifugal force, reduces the possibility of an insulating film in a finished cell punctured by the pole tabs 12 turned outward and bent, and improves the rate of finished product of a cell formed by winding and safety of subsequent use.

Below, the technical solution of the conveying roller 20 will be described further through specific embodiments, but the following embodiments do not limit the protection scope of the claims of the present disclosure.

First Embodiment

Referring to FIGS. 3 and 4, the conveying roller 20 in the embodiment of the present disclosure includes a mandrel 23 and a first rotating cylinder 24 sleeved on the mandrel 23. The axis of the mandrel 23 coincides with the central axis 20a. The mandrel 23 has a first end and a second end opposed to each other in an axial direction. An end face of the first end configured as the first end face 21, and an end face of the second end is configured as the second end face 22. The first rotating cylinder 24 in this embodiment is configured as the transmission portion. The first rotating cylinder 24 is configured as a straight cylinder. The space between the end face of the first rotating cylinder 24 facing the second end face 22 and the second end face 22 forms the avoidance position 25. When the conveying roller 20 conveys the cell pole piece 10, the bearing area 11a of the cell pole piece 10 can abut against an outer peripheral surface of the first rotating cylinder 24. In the axial direction of the first rotating cylinder 24 (also referred to as the width direction X), the transition area 11b of the cell pole piece 10 and the entire pole tabs 12 are located outside the first rotating cylinder 24 and correspond to the avoidance position 25. As a result, the entire transition area 11b and the entire pole tabs 12 will not be in contact with the conveying roller 20.

In this embodiment, a difference between the radius of the first rotating cylinder 24 and a radius of the mandrel 23 ranges from 0.1 mm to 0.5 mm, that is, a depth D of the avoidance position 25 in the radial direction of the first rotating cylinder 24 0.5 mm 0.1 mm to 0.5 mm. After the pole piece blank is subjected to the cutting process to form the cell pole piece 10, there is a difference in the height of the protrusions formed on both the edge of the main body 11 and the edge of the pole tab 12. The avoidance position 25 included in the conveying roller 20 can adapt to the protrusions of different heights, so as to well avoid the raised area of the edge of the cell pole piece 10, and improve the adaptability of the avoidance position 25.

An annular edge of the first rotating cylinder 24 in this embodiment adjacent to the second end face 22 includes a rounded transition structure 24a. The outer peripheral surface of the first rotating cylinder 24 and the end face of the first rotating cylinder 24 are connected by the rounded transition structure 24a. A small gap is maintained between the rounded transition structure 24a of the first rotating cylinder 24 and the main body 11 of the cell pole piece 10, so that when the first rotating cylinder 24 rotates at a high speed, the annular edge of the first rotating cylinder 24 does not apply stress to the main body 11 of the cell pole piece 10. In this way, stress concentration will not arise at a position of the main body 11 corresponding to the annular edge, which effectively reduces the possibility of the main body 11 being cut or punctured by the annular edge and is beneficial to improve the structural integrity of the cell pole piece 10 and its safety during conveying.

The material of the first rotating cylinder 24 in this embodiment may be aluminum alloy, carbon brazing, rubber, or magnesium aluminum alloy, etc. The first rotating cylinder 24 in this embodiment is rotatably connected to the mandrel 23 via a bearing. A retaining ring and an end cover are provided on a side of the first rotating cylinder 24 adjacent to the second end face 22 to fix the first rotating cylinder 24. The conveying roller 20 is connected and fixed to another mounting platform via the first end of the mandrel 23. The conveying roller 20 in this embodiment further includes a roller support (not shown in the figure). The roller support is connected to the second end of the mandrel 23, and is used to provide a supporting force to the mandrel 23, so that the stability of the conveying roller 20 at high speed is better, which is beneficial to reduce the vibration of the conveying roller 20, reduce the possibility of jitter of the cell pole piece 10 during the conveying process and improve the steadiness of the cell pole piece 10 during the conveying process.

Second Embodiment

In the first embodiment, the structure of the conveying roller 20 has been described. In this embodiment, differences from the first embodiment will be mainly described, and the same structure will not be described repeatedly in this embodiment.

Figure 5:
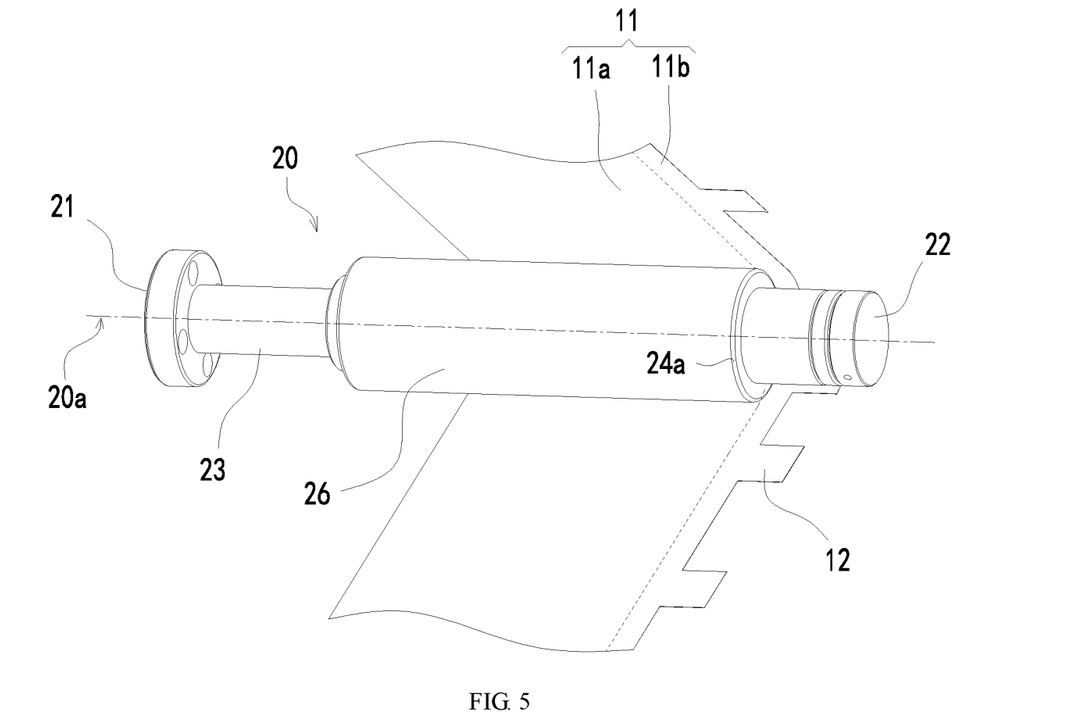
FIG. 5 is an isometric schematic view of a fitting state of a conveying roller and a cell pole piece according to another embodiment of the present disclosure.
Figure 6:
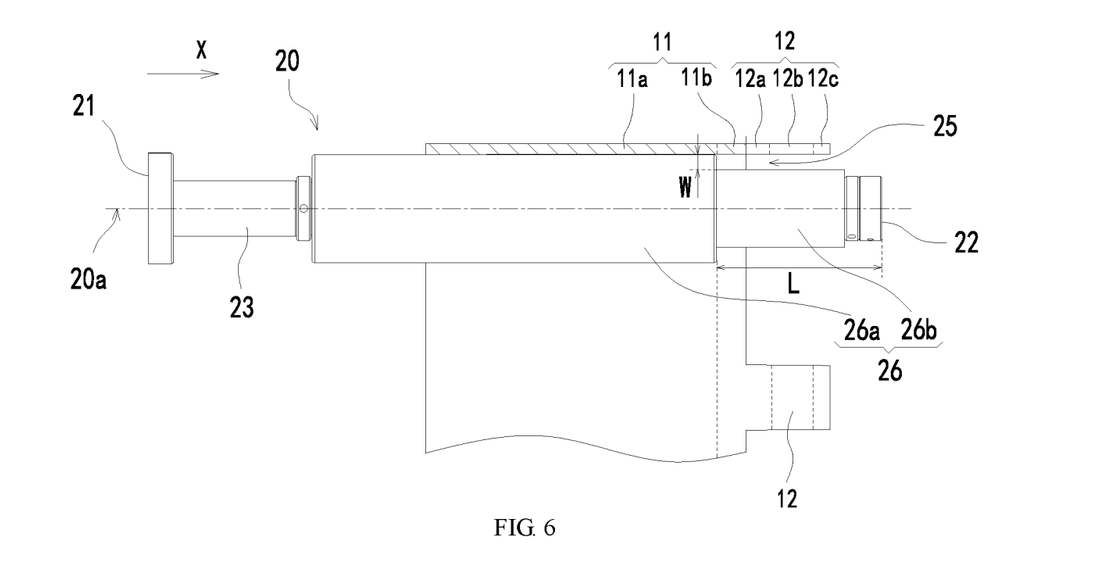
FIG. 6 is a partial structure schematic view of a mating state of a conveying roller and a cell pole piece according to another embodiment of the present disclosure.

Referring to FIG. 5 and FIG. 6, the conveying roller 20 in this embodiment includes the mandrel 23 and a second rotating cylinder 26 sleeved on the mandrel 23. The mandrel 23 includes the first end and the second end opposite to each other in the axial direction. The end face of the first end is configured as the first end face 21, and the end face of the second end 22 is configured as the second end face 22. The second rotating cylinder 26 in this embodiment is configured as a straight cylinder as a whole. The second rotating cylinder 26 includes a first shaft section 26a and a second shaft section 26b. The first shaft section 26a and the second shaft section 26b are arranged along the axial direction of the second rotating cylinder 26. The diameter of the first shaft section 26a is larger than that of the second shaft section 26b. The first shaft section 26a in the embodiment is configured as the transmission portion. When the conveying roller 20 conveys the cell pole piece 10, the bearing area 11a of the cell pole piece 10 can abut against the outer peripheral surface of the first shaft section 26a. The space between the outer peripheral surface of the first shaft section 26a and the outer peripheral surface of the second shaft section 26b forms the avoidance point 25. In the axial direction of the second rotating cylinder 26 (also referred as the width direction X), the transition area 11b and the entire pole tabs 12 of the cell pole piece 10 are located outside the first shaft section 26a and are in correspondence with the avoidance point 25, so that the entire transition area 11b and the entire pole tabs 12 do not touch the conveying roller 20.

The difference between the radius of the first shaft section 26a and the radius of the second shaft section 26b in this embodiment ranges from 0.1 mm to 0.5 mm, that is, the depth W of the avoidance position 25 along the radial direction of the second rotating cylinder 26 ranges from 0.1 mm to 0.5 mm. After the pole piece blank is cut to form the cell core pole piece 10, there is a difference in the height of the protrusions formed on both the edge of the main body 11 and the edge of the pole tabs 12. The avoidance point 25 in this embodiment can adapt to the protrusions of different heights, so as to well avoid the raised area of the edge of the cell pole piece 10, and improve the adaptability of the avoidance position 25. In addition, a portion of the cell pole piece 10 corresponding to the avoidance position 25 is configured as a suspended portion. When the suspended portion is in a certain position, the suspended portion will sag toward the second shaft section 26b under the effect of its own gravity, and the second shaft section 26b can support the suspended portion where the sagging occurs, thereby avoiding wrinkles and deformation caused by excessive sagging of the suspended portion.

The distance L between the end face of the first shaft section 26a facing the second end face 22 and the end face of the second shaft section 26b facing the second end face 22 ranges from 5 mm to 30 mm. When the distance is less than 5 mm, the first shaft section 26a overlaps the transition area 11b of the main body 11, and the transition area 11b of the main body 11 cannot be effectively avoided. The portion of the cell pole piece 10 located outside the first shaft section 26a (that is, not in contact with the outer peripheral surface of the first shaft section 26a) is configured as the suspended portion. When the distance is greater than 30 mm, the suspended portion of cell pole piece 10 located outside the first shaft section 26a is too much, and thereby the suspended portion will sag as a whole under the action of gravity. As a result, wrinkles appear in the suspended portion and meanwhile the sagging suspended portion will apply a pulling force to a portion of the cell pole piece 10 in contact with the first shaft section 26a, which will cause the portion of the cell pole piece 10 in contact with the first shaft section 26a to be separated from the first shaft section 26a, and further cause the conveying roller 20 to fail to convey the cell pole piece 10 normally or cause the cell pole piece 10 wound on the conveying roller 20 to be torn or torn out by the conveying roller 20.

The annular edge of the first shaft section 26a in this embodiment adjacent to the second end face 22 includes the rounded transition structure 24a. The outer peripheral surface of the first shaft section 26a and the end face of the first shaft section 26a are connected by the rounded transition structure 24a. A small gap is maintained between the rounded transition structure 24a of the first shaft section 26a and the main body 11 of the cell pole piece 10, so that when the second rotating cylinder rotates at high speed, the annular edge of the first shaft section 26a will not apply stress to the main body 11 of the cell pole piece 10. In this way, stress concentration will not arise at the annular edge of the first shaft section 26a, which effectively reduces the possibility of the main body 11 being cut or punctured by the annular edge and is beneficial to improve the structural integrity of the cell pole piece and its safety during conveying.

The material of the second rotating cylinder 26 in this embodiment may be aluminum alloy, carbon brazing, rubber, or magnesium aluminum alloy, etc. The second rotating cylinder 26 in this embodiment is rotatably connected to the mandrel 23 via a bearing. A retaining ring and an end cover are provided on a side of the second shaft section 26b adjacent to the second end face 22 to fix the second rotating cylinder 26. The conveying roller 20 is connected and fixed to another mounting platform via the first end of the mandrel 23. The conveying roller 20 in this embodiment further includes a roller support (not shown in the figure). The roller support is connected to the second end of the mandrel 23, and is used to provide a supporting force to the mandrel 23, so that the stability of the conveying roller 20 at high speed is better, which is beneficial to reduce the vibration of the conveying roller 20, reduce the possibility of jitter of the cell pole piece 10 during the conveying process and improve the steadiness of the cell pole piece 10 during the conveying process.

Third Embodiment

In the first embodiment and the second embodiment, the structure of the conveying roller 20 has been described. In this embodiment, differences between the first embodiment and the second embodiment will be mainly described, and the same structure will not be repeatedly described in this embodiment.

Figure 7:
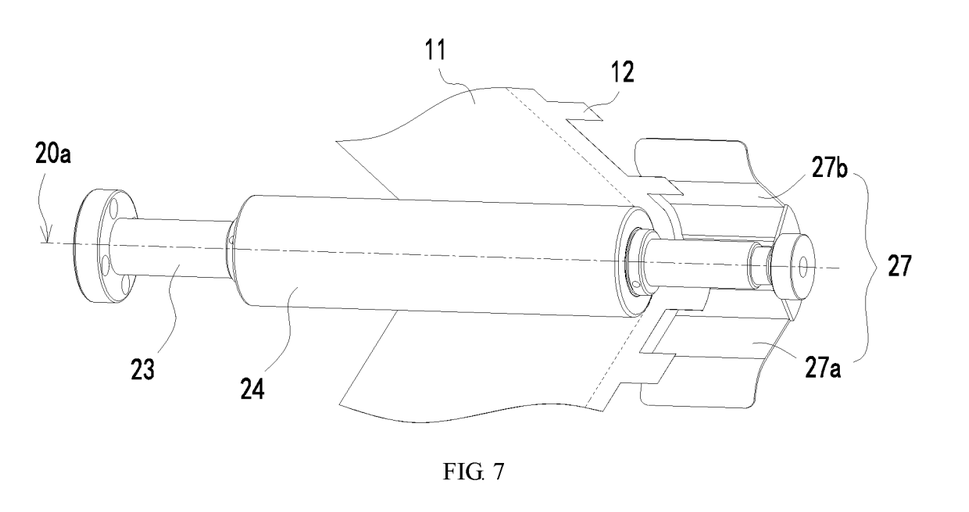
FIG. 7 is an isometric schematic view of a mating state of a conveying roller and a cell pole piece according to another embodiment of the present disclosure.

As shown in FIG. 7, the conveying roller 20 in this embodiment further includes a smoothing part 27. The smoothing part 27 is provided corresponding to the avoidance position 25 in position. The pole tabs 12 of the cell pole piece 10 can pass between the smoothing part 27 and the avoidance position 25. The smoothing part 27 can apply force toward the central axis 20a to the pole tabs 12 to smooth the pole tabs 12. As the conveying roller 20 includes the avoidance position 25 and the smoothing part 27 is provided corresponding to the avoidance position 25 in position, a sufficiently large gap can be reserved between the smoothing part 27 and the conveying shaft. In this way, the transition area 11b and the pole tabs 12 of the cell pole piece 10 can easily pass through the gap, and the possibility of collision and scratching with the conveying roller 20 and/or the smoothing part 27 is low. Therefore, it is possible to greatly reduce the difficulty of passing of the cell pole piece 10, and at the same time the structural integrity of the cell pole piece 10 during the passing process is ensured, and the pole tabs 12 are prevented from being scratched or broken, thereby effectively improving the passing efficiency and reducing production costs. When the pole tabs 12 are turned outward or bent under the action of centrifugal force and come into contact with the smoothing part 27, the smoothing part 27 in this embodiment can apply resistance to the pole tabs 12 to ensure a small deformation amount of the pole tabs 12 during the conveying of the cell pole piece 10 to prevent the pole tabs 12 from being largely turned outward or bent, and reduce the possibility of the pole tabs 12 puncturing the an insulating film after the cell pole piece 10 is wound to form the cell.

The smoothing part 27 in this embodiment includes a first smoothing plate 27a and a second smoothing plate 27b. The first smoothing plate 27a and the second smoothing plate 27b are arranged around the central axis 20a. The first smoothing plate 27a and the second smoothing plate 27b are connected to each other, so that the pole tabs 12 can continue to be restricted and restrained by the second smoothing plate 27b after passing through the first smoothing plate 27a. The first smoothing plate 27a and the second smoothing plate 27b in this embodiment are connected to a rotating shaft, and the axis of the rotating shaft coincides with the axis of the conveying roller 20. The cell pole piece 10 includes a roll-in segment on a roll-in side and a roll-out segment on a roll-out side. An angle is formed between the roll-in segment and the roll-out segment. Both the first smoothing plate 27a and the second smoothing plate 27b can arbitrarily rotate around the rotating shaft, so that positions of the first smoothing plate 27a and the second smoothing plate can be flexibly adjusted according to the angle between the roll-in segment and the roll-out segment of the cell pole piece 10, thereby ensuring the pole tabs 12 to keep in contact with the first smoothing plate 27a and the second smoothing plate 27b and a balanced contact strength between the pole tabs 12 and the first smoothing plate 27a and between the pole tabs 12 and the second smoothing plate 27b.

In the case where the conveying roller 20 includes the mandrel 23, the smoothing plate 27 in this embodiment may be directly connected and fixed to the second end of the mandrel 23. The smoothing plate 27 in this embodiment may be separately provided on other mounting platforms.

The conveying roller 20 in this embodiment includes the central axis 20a, the first end face 21 and the second end face 22 disposed opposite to each other along the central axis 20a, and the transmission portion and the avoidance position 25 disposed between the first end face 21 and the second end face 22. The transmission portion and the avoidance position 25 are arranged along the central axis 20a. The transmission portion can rotate around the center axis 20a. When the conveying roller 20 conveys the cell pole piece 10, the bearing area 11a of the cell pole piece 10 can be in contact with the transmission portion, so that the transmission portion applies a transmission friction force to the cell pole piece 10 and thereby the cell pole piece 10 is moved by the transmission portion. At the same time, the avoidance position 25 of the conveying roller 20 can avoid the transition area 11b and the entire pole tabs 12 of the cell pole piece 10. In this way, in the process of the conveying roller 20 in this embodiment conveying the cell pole piece 10, as the conveying roller 20 includes the avoidance position 25, uneven edges of the main body 11 between two pole tabs 12 will not contact with the conveying roller 20. The conveying roller 20 does not apply compressive stress to a raised area in the uneven edges of the main body 11 and the pole tabs 12, so that the pole tabs 12 do not move in a direction away from the conveying roller 20 by a distance which is the same as the protruding height of the raised area. Therefore, when the conveying roller 20 drives the cell pole piece 10 to rotate at high speed, the centrifugal force experienced by the pole tabs 12 will not increase, which effectively reduces the possibility of the pole tabs 12 turning outward and bending away from the conveying roller 20 under the effect of the centrifugal force, reduces the possibility of the insulating film punctured by the pole tabs 12 turned outward and bent, and improves the yield of a cell formed by winding and safety of subsequent use.

Figure 8:
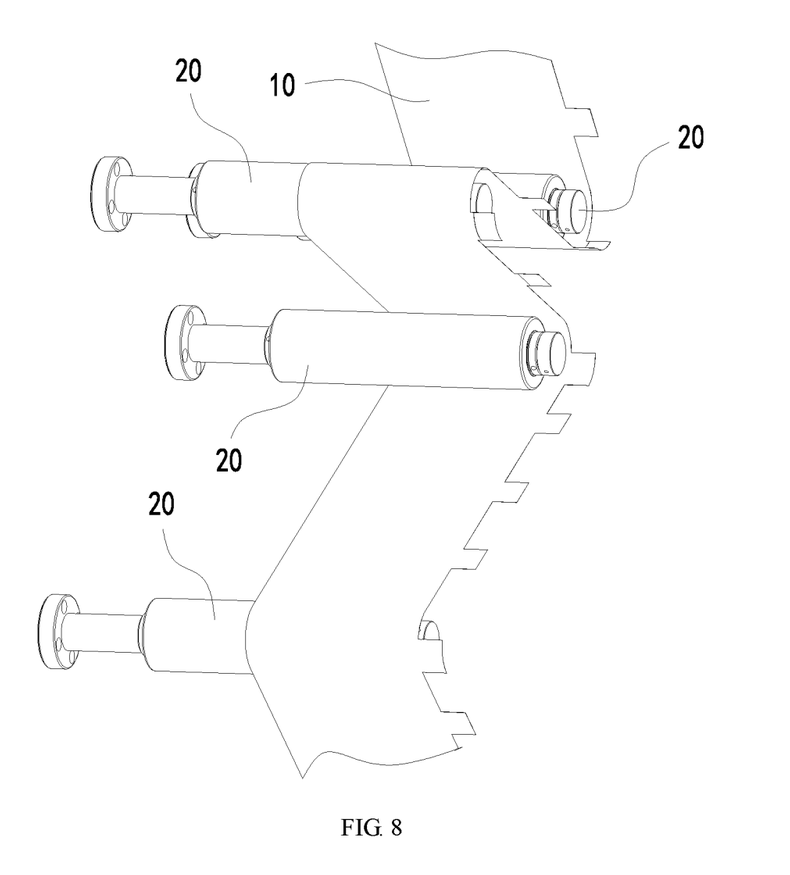
FIG. 8 is a schematic view of a transmission mechanism transmitting a cell pole piece according to an embodiment of the present disclosure.

As shown in FIG. 8, a plurality of conveying rollers 20 in this embodiment can form a conveying mechanism to change a conveying direction and tension during conveying of the cell pole pieces 10 via the plurality of conveying rollers 20.

An embodiment of the present disclosure also provides a winder. The winder includes the conveying roller 20 of the above-mentioned embodiment. The winder in this embodiment can effectively reduce the possibility of the pole tabs 12 turning outward and bending via the conveying roller 20, thereby reducing the possibility of the pole tabs 12 puncturing the isolation film in the finished cell and improving the yield of the finished cell.

An embodiment of the present disclosure also provides a method for conveying a cell pole piece, in which the cell pole piece 10 is conveyed via the conveying roller 20 of the above embodiment. The transmission portion applies a transmission friction force to the bearing area 11a of the cell pole piece 10 to drive the cell pole piece 10 to move in the transmission direction, and the avoidance position 25 of the conveying roller 20 avoids the transition area 11b and the pole tabs 12 of the cell pole piece 10. In this method, the cell pole piece 10 is conveyed by the conveying roller 20 of the above embodiment, thereby effectively reducing the possibility of the pole tabs 12 turning outward and bending during the conveying process, reducing the pole tabs 12 puncturing the isolating film in the finished cell and improving the yield of the finished cell.

Although the present disclosure has been described with reference to the preferred embodiments, various modifications may be made thereto and components thereof may be replaced with equivalents without departing from the scope of the present disclosure. In particular, as long as there is no structural conflict, the technical features mentioned in the embodiments can be combined in any manner. The present disclosure is not limited to the specific embodiments disclosed herein, but includes all technical solutions that fall within the scope of the claims.

What is claimed is:

1. A conveying roller for conveying a cell pole piece, the cell pole piece comprising a main body and pole tabs, the main body comprising a bearing area and a transition area, each of the pole tabs comprising a root portion connected to the transition area, a middle section and a top portion, and the conveying roller comprising:

a central axis, a first end face and a second end face disposed opposite to each other along the central axis, a transmission portion and an avoidance position provided between the first end face and the second end face, wherein the transmission portion is rotatable around the central axis, the bearing area is contactable with the transmission portion, so that the transmission portion applies a transmission friction force to the cell pole piece, and the avoidance position is formed as a space on the conveying roller for keeping both the cell pole piece and the transmission portion in a suspended state, so the avoidance position is capable of avoiding the transition area and the pole tabs.

2. The conveying roller according to claim 1, wherein the conveying roller comprises a mandrel, an axis of the mandrel coincides with the central axis, the transmission portion is configured as a first rotating cylinder sleeved on the mandrel, the bearing area is capable of abutting against an outer peripheral surface of the first rotating cylinder, two end faces of the mandrel opposite to each other along the central axis respectively form the first end face and the second end face, and a space between an end face of the first rotating cylinder facing the second end face and the second end face forms the avoidance position.

3. The conveying roller according to claim 2, wherein a difference between a radius of the first rotating cylinder and a radius of the mandrel ranges from 0.1 mm to 0.5 mm.

4. The conveying roller according to claim 2, wherein an annular edge of the first rotating cylinder adjacent to the second end face comprises a rounded transition structure.

5. The conveying roller according to claim 1, wherein the conveying roller comprises a mandrel and a second rotating cylinder sleeved on the mandrel, two end faces of the mandrel opposite to each other along the central axis respectively form the first end face and the second end face, the second rotating cylinder comprises a first shaft section and a second shaft section, a diameter of the first shaft section is larger than that of the second shaft section, the transmission portion is configured as the first shaft section, the bearing area is capable of abutting against an outer peripheral surface of the first shaft section, and a space between an outer peripheral surface of the first shaft section and an outer peripheral surface of the second shaft section forms the avoidance position.

6. The conveying roller according to claim 5, wherein a difference between a radius of the first shaft section and a radius of the second shaft section ranges from 0.1 mm to 0.5 mm.

7. The conveying roller according to claim 5, wherein a distance between an end face of the first shaft section facing the second end face and an end face of the second shaft section facing the second end face ranges from 5 mm to 30 mm.

8. The conveying roller according to claim 5, wherein an annular edge of the first shaft section adjacent to the second end face comprises a rounded transition structure.

9. The conveying roller according to claim 8, wherein the conveying roller further comprises a smoothing part provided corresponding to the avoidance position in position, the pole tabs are capable of passing between the smoothing part and the avoidance position, and the smoothing part is capable of applying a force to the pole tabs toward the central axis to smooth the pole tabs.

10. The conveying roller according to claim 9, wherein the smoothing part comprises a first smoothing plate and a second smoothing plate, and the first smoothing plate and the second smoothing plate are arranged around the central axis.

11. A winder comprising the conveying roller according to claim 1.

12. The winder according to claim 11, wherein the conveying roller comprises a mandrel, an axis of the mandrel coincides with the central axis, the transmission portion is configured as a first rotating cylinder sleeved on the mandrel, the bearing area is capable of abutting against an outer peripheral surface of the first rotating cylinder, two end faces of the mandrel opposite to each other along the central axis respectively form the first end face and the second end face, and a space between an end face of the first rotating cylinder facing the second end face and the second end face forms the avoidance position.

13. The winder according to claim 12, wherein a difference between a radius of the first rotating cylinder and a radius of the mandrel ranges from 0.1 mm to 0.5 mm.

14. The winder according to claim 12, wherein an annular edge of the first rotating cylinder adjacent to the second end face comprises a rounded transition structure.

15. The winder according to claim 11, wherein the conveying roller comprises a mandrel and a second rotating cylinder sleeved on the mandrel, two end faces of the mandrel opposite to each other along the central axis respectively form the first end face and the second end face, the second rotating cylinder comprises a first shaft section and a second shaft section, a diameter of the first shaft section is larger than that of the second shaft section, the transmission portion is configured as the first shaft section, the bearing area is capable of abutting against an outer peripheral surface of the first shaft section, and a space between an outer peripheral surface of the first shaft section and an outer peripheral surface of the second shaft section forms the avoidance position.

16. The winder according to claim 15, wherein a difference between a radius of the first shaft section and a radius of the second shaft section ranges from 0.1 mm to 0.5 mm.

17. The winder according to claim 15, wherein a distance between an end face of the first shaft section facing the second end face and an end face of the second shaft section facing the second end face ranges from 5 mm to 30 mm.

18. The winder according to claim 15, wherein an annular edge of the first shaft section adjacent to the second end face comprises a rounded transition structure.

19. The winder according to claim 18, wherein the conveying roller further comprises a smoothing part provided corresponding to the avoidance position in position, the pole tabs are capable of passing between the smoothing part and the avoidance position, and the smoothing part is capable of applying a force to the pole tabs toward the central axis to smooth the pole tabs.

20. A method for conveying a cell pole piece, wherein the conveying roller according to claim 1 is used to convey the cell pole piece, and the transmission portion applies a transmission friction force to the bearing area of the cell pole piece to drive the cell pole piece to move in a transmission direction, and the avoidance position of the conveying roller avoids the transition area and the pole tabs of the cell pole piece.

* * * * *